United States Patent
Green et al.

(10) Patent No.: US 7,616,627 B2
(45) Date of Patent: Nov. 10, 2009

(54) TECHNIQUES FOR HIGH DEFINITION AUDIO MODEMS

(75) Inventors: Jeffrey Allan Green, Wake Forest, NC (US); Mark Gentry, Raleigh, NC (US)

(73) Assignee: Intel Corporation, Santa Clara, CA (US)

( * ) Notice: Subject to any disclaimer, the term of this patent is extended or adjusted under 35 U.S.C. 154(b) by 574 days.

(21) Appl. No.: 11/172,015

(22) Filed: Jun. 29, 2005

(65) Prior Publication Data

US 2007/0008896 A1 Jan. 11, 2007

(51) Int. Cl.
*H04L 12/50* (2006.01)
*H04Q 11/00* (2006.01)
*H04B 1/38* (2006.01)
*H04L 5/16* (2006.01)

(52) U.S. Cl. .................. 370/364; 370/328; 370/338; 370/286; 370/508; 370/159; 375/222; 375/220; 375/219; 709/201; 709/204; 709/212; 709/223

(58) Field of Classification Search .............. 370/328, 370/286, 338, 364, 363; 375/222, 220, 219
See application file for complete search history.

(56) References Cited

U.S. PATENT DOCUMENTS

| | | | | |
|---|---|---|---|---|
| 5,309,440 A | * | 5/1994 | Nakamura et al. | 370/420 |
| 5,784,406 A | * | 7/1998 | DeJaco et al. | 375/224 |
| 5,953,411 A | * | 9/1999 | Farrell | 379/406.02 |
| 6,075,784 A | * | 6/2000 | Frankel et al. | 370/356 |
| 6,112,266 A | * | 8/2000 | Yeh | 710/52 |
| 6,144,695 A | * | 11/2000 | Helms et al. | 375/222 |
| 6,400,759 B1 | * | 6/2002 | Liu et al. | 375/222 |
| 6,405,268 B1 | * | 6/2002 | Zhou et al. | 710/48 |
| 6,480,473 B1 | * | 11/2002 | Chambers et al. | 370/253 |
| 6,577,639 B1 | * | 6/2003 | Read | 370/412 |
| 6,657,962 B1 | * | 12/2003 | Barri et al. | 370/235 |
| 6,678,316 B1 | * | 1/2004 | Helms et al. | 375/222 |
| 2004/0003046 A1 | * | 1/2004 | Grabelsky et al. | 709/206 |
| 2004/0095994 A1 | * | 5/2004 | Dowling | 375/222 |
| 2004/0161064 A1 | * | 8/2004 | Brethour et al. | 375/347 |

* cited by examiner

*Primary Examiner*—Huy Q Phan
(74) *Attorney, Agent, or Firm*—Kacvinsky LLC

(57) ABSTRACT

A system, apparatus, method and article for high definition audio modems are described. The apparatus may include a communications path comprising a communications bus and buffers, a codec to couple to the communications bus, and a processor to couple to the communications bus. The processor may be arranged to execute instructions for a software modem to determine a round trip delay value for a communications path, and adjust the round trip delay value by varying input to one of the buffers. Other embodiments are described and claimed.

17 Claims, 4 Drawing Sheets

TECHNIQUES FOR HIGH DEFINITION AUDIO MODEMS

BACKGROUND

A modulator/demodulator ("modem") may be used to communicate digital signals over an analog network, such as the Public Switched Telephone Network (PSTN), for example. A modem may be implemented in hardware or software. Software modems are typically executed by a processing system such as a computer, and may therefore be subject to the performance constraints of the processing system. Consequently, software modems may not provide the same set of functionality as a hardware modem. Accordingly, there may be a need for improvements in software modems.

DETAILED DESCRIPTION

Figure 1:
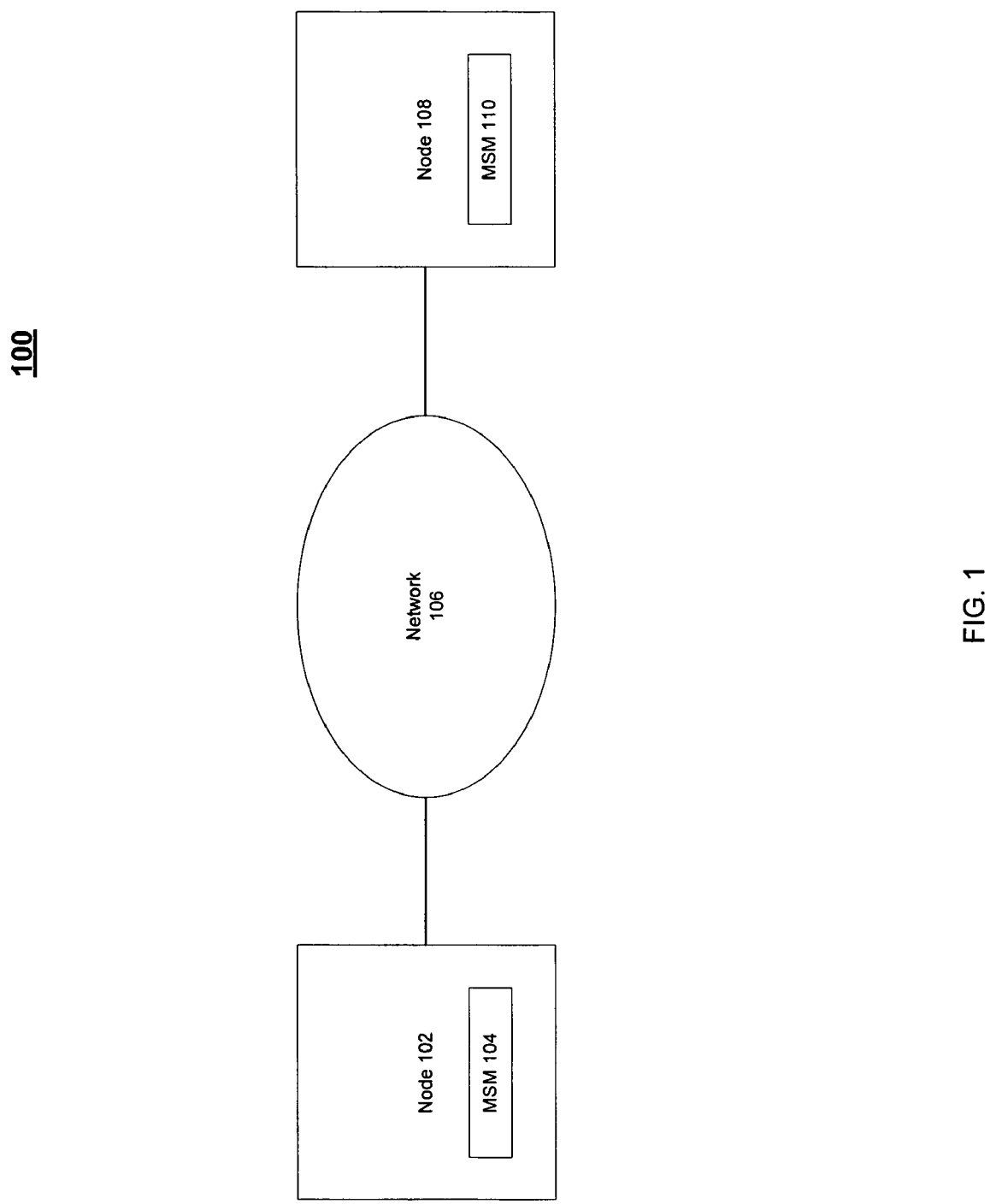
FIG. 1 illustrates one embodiment of a system.

FIG. 1 illustrates a block diagram of a system 100. In one embodiment, for example, the system 100 may comprise a communication system having multiple nodes. A node may comprise any physical or logical entity for communicating information in the system 100 and may be implemented as hardware, software, or any combination thereof, as desired for a given set of design parameters or performance constraints. Although FIG. 1 is shown with a limited number of nodes in a certain topology, it may be appreciated that system 100 may include more or less nodes in any type of topology as desired for a given implementation. The embodiments are not limited in this context.

In various embodiments, a node may comprise a processing system, a computer system, a computer sub-system, a computer, a workstation, a terminal, a server, a personal computer (PC), a laptop computer, an ultra-laptop computer, a portable computer, a handheld computer, a personal digital assistant (PDA), a microprocessor, an integrated circuit, a programmable logic device (PLD), a digital signal processor (DSP), a processor, a circuit, a logic gate, a register, a microprocessor, an integrated circuit, a semiconductor device, a chip, a transistor, and so forth. The embodiments are not limited in this context.

In various embodiments, a node may comprise, or be implemented as, software, a software module, an application, a program, a subroutine, an instruction set, computing code, words, values, symbols or combination thereof. A node may be implemented according to a predefined computer language, manner or syntax, for instructing a processor to perform a certain function. Examples of a computer language may include C, C++, Java, BASIC, Perl, Matlab, Pascal, Visual BASIC, assembly language, machine code, microcode for a processor, and so forth. The embodiments are not limited in this context.

In various embodiments, system 100 may be implemented as a wired communication system, a wireless communication system, or a combination of both. When implemented as a wired system, for example, system 100 may include one or more nodes arranged to communicate information over one or more wired communications media. Examples of wired communications media may include a wire, cable, printed circuit board (PCB), backplane, switch fabric, semiconductor material, twisted-pair wire, category 3 or 5 wire, co-axial cable, fiber optics, and so forth. The wired communications media may be connected to a node using an input/output (I/O) adapter. The I/O adapter may be arranged to operate with any suitable technique for controlling information signals between nodes using a desired set of communications protocols, services or operating procedures. The I/O adapter may also include the appropriate physical connectors to connect the I/O adapter with a corresponding communications medium. Examples of an I/O adapter may include a network interface, a network interface card (NIC), disc controller, video controller, audio controller, analog front end, a modem, a line card, and so forth. Although system 100 may be illustrated using a particular communications medium by way of example, it may be appreciated that the principles and techniques discussed herein may be implemented using any type of communication media and accompanying technology. The embodiments are not limited in this context.

In one embodiment, for example, system 100 may include nodes 102, 108. Nodes 102, 108 may comprise any device having a processing system as previously described, such as a computer, PC, server, laptop computer, notebook computer, ultra-light computer, handheld computer, portable computer, workstation, PDA, and so forth. In one embodiment, for example, nodes 102, 108 may comprise mobile computers having a processor and memory. The embodiments, however, are not limited in this context.

In one embodiment, for example, nodes 102, 108 may be coupled to a network 106. Network 106 may comprise any type of network arranged to communicate information between the various nodes of system 100 using analog signals (e.g., tones). For example, network 106 may comprise a circuit-switched network such as a telephone network or Public Switched Telephone Network (PSTN). The embodiments are not limited in this context.

In one embodiment, for example, one or more nodes may include a modem sub-system module (MSM), such as MSM 104, 110. MSM 104, 110 may each include a software modem implemented using a processing system, such as a processor and memory. MSM 104, 110 may also include an analog front end to interface with network 106, and a communications bus to communicate information between the software modem and the analog front end. The analog front end may comprise, for example, an analog-to-digital converter (ADC), a digital-to-analog converter (DAC), telephone line connectors, interfaces, and other elements to communicate analog signals over network 106. In some implementations, an ADC and a DAC may be implemented together in a single chip, such as a coder/decoder ("codec"), for example. The embodiments are not limited in this context.

In one embodiment, MSM 104 and/or 110 may include a software modem. A software modem may comprise a software program that enables a processing system such as a computer to perform data communications over network 106. Computers are digital devices arranged to process and manipulate digital signals which change between two values to signify the binary digits. An analog network such as network 106, however, may communicate information using only tones. The modems of MSM 104, 110 may be used to perform data communications on behalf of nodes 102, 108 in order to communicate digital data using the tones carried by the telephone lines of network 106. For example, the modems of MSM 104, 110 may modulate a carrier wave such as a sine wave with a digital signal. Any number of modulation techniques may be used, such as amplitude shift keying (ASK), frequency shift keying (FSK), differential phase shift keying (DPSK), and so forth. In general operation, a software modem of MSM 104 may modulate tones with digital information, and transmit the modulated signals to a software or hardware modem of MSM 110 via network 106. MSM 110 may demodulate the modulated signals into digital information for recovery by node 108. The embodiments are not limited in this context.

In one embodiment, MSM 104, 110 may also include a codec to convert digital information to analog information. A codec may convert or decode a digital signal into an analog representation of the digital signal. The quality of the analog representation may depend upon the sampling rate. Typically expressed in samples per second, or hertz (Hz), the sampling rate may refer to the rate at which samples of an analog signal are taken in order to be converted into digital form during ADC operations. For example, a computer may have a sound card to sample a received analog signal in the form of voice signals, such as received through a microphone, and digitize it for use by the computer. In general, a higher sampling rate provides a better quality reproduction than a lower sampling rate. Consequently, the level of the sampling rate during ADC operations typically determines the quality of reproduction of the analog signal during DAC operations.

In some implementations, it may be desirable for a user to be able to alter the quality of the output analog signals by modifying the sampling rate for the codec operations. Varying the sampling rate for software modems, however, may be relatively difficult compared to hardware modems. A hardware modem typically has direct access to the codec. Such direct access allows the hardware modem to control the buffers used to store digital samples to achieve the desired level of performance. Software modems, however, typically do not have direct access to the codec. Rather, software modems may need to access the codec over a communications bus used by the processing system, thereby introducing various hardware and/or software constraints. Furthermore, software modems may not have access to all the buffers within the communication path between the software modem and codec. Some buffers may be under the control of other software programs, such as various device drivers. Consequently, a user may have some difficulty modifying a sampling rate for a codec due to these and other hardware and/or software design and performance constraints.

The various embodiment may solve these and other problems. The various embodiments may be arranged to allow a software modem to determine a round trip delay value for a communications path having one or more buffers of indeterminate size. This may be useful, for example, in a number of applications. For example, determining the round trip delay value may assist in system initialization operations, such as when the software modem is first initialized as node 102 is powered-up and the initial sampling rate needs to be established. Furthermore, changes or variations in the sampling rate may also need to be addressed. For example, it may be desirable for a user or the software modem to modify a sampling rate for a codec to vary quality of an audio signal while remaining within the hardware and/or software performance constraints of the underlying processing system used to execute the software modem.

In various embodiments, for example, MSM 104, 110 may each comprise a communications path comprising a communications bus and multiple buffers. MSM 104, 110 may also include a codec to couple to the communications bus. MSM 104, 110 may further include a processor to couple to the communications bus. The processor may be arranged to execute instructions for the software modem. For example, the processor may determine a round trip delay value for a communications path, and adjust the round trip delay value by varying input to one of the buffers. In another example, the processor may modify a sampling rate for the codec automatically or in response to a user command. The processor may determine a round trip delay value for the communications path, and adjust the round trip delay value in response to the modified sampling rate. Other embodiments are described and claimed. System 100 in general, and MSM 104, 110 in particular, may be described in more detail with reference to FIGS. 2-4.

Figure 2:
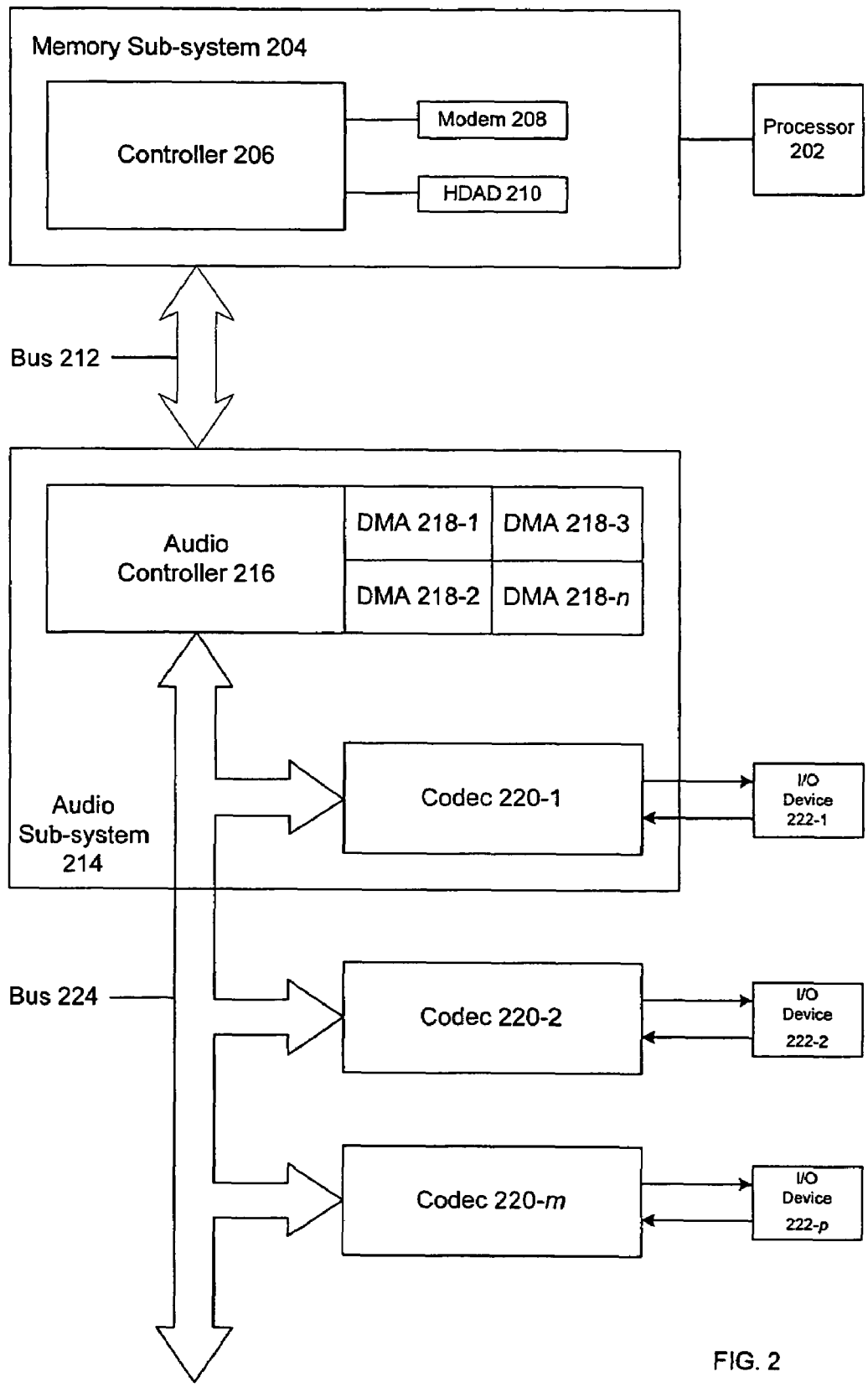
FIG. 2 illustrates one embodiment of a node.

FIG. 2 illustrates a block diagram of a node in accordance with one embodiment of the system. FIG. 2 illustrates a block diagram of a node 200. Node 200 may be representative of some of the elements for a node suitable for use with system 100 as described with reference to FIG. 1, such as nodes 102, 108, for example. The embodiments are not limited, however, to the example given in FIG. 2.

As shown in FIG. 2, node 200 may comprise multiple elements. These elements, or any sub-elements, may be implemented using one or more circuits, components, registers, processors, software subroutines, modules, or any combination thereof, as desired for a given set of design or performance constraints. Although FIG. 2 shows a limited number of elements by way of example, it can be appreciated that more or less elements may be used in node 200 as desired for a given implementation. The embodiments are not limited in this context.

In one embodiment, node 200 may include a processor 202. Processor 202 may be implemented as any processor, such as a complex instruction set computer (CISC) microprocessor, a reduced instruction set computing (RISC) microprocessor, a very long instruction word (VLIW) microprocessor, a processor implementing a combination of instruction sets, or other processor device. In one embodiment, for example, processor 202 may be implemented as a general purpose processor, such as a processor made by Intel® Corporation, Santa Clara, Calif. Processor 202 may also be implemented as a dedicated processor, such as a controller, microcontroller, embedded processor, a digital signal processor (DSP), a network processor, a media processor, an input/output (I/O) processor, a media access control (MAC) processor, a radio baseband processor, and so forth. The embodiments, however, are not limited in this context.

In one embodiment, for example, node 200 may be implemented as a mobile computer built on the Intel Centrino™ mobile technology and supporting chipsets as developed by Intel Corporation. In this example, node 200 may use a High Definition Audio (HDA) architecture designed to increase audio quality with a higher bit rate and wider data words than conventional architectures. The HDA architecture may provide support for multiple microphones, audio jack retasking, and multiple audio streams. The embodiments are not limited in this context.

In one embodiment, node 200 may include a memory sub-system 204. Memory sub-system 204 may include a memory controller 206. Memory controller 206 may comprise any suitable memory controller. The embodiments are not limited in this context.

In one embodiment, memory sub-system 204 may also include any machine-readable or computer-readable media capable of storing data, including both volatile and non-volatile memory. For example, memory sub-system 204 may include read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, or any other type of media suitable for storing information. It is worthy to note that some portion or all of memory sub-system 204 may be included on the same integrated circuit as processor 202, or alternatively some portion or all of memory sub-system 204 may be disposed on an integrated circuit or other medium, for example a hard disk drive, that is external to the integrated circuit of processor 202. The embodiments are not limited in this context.

In one embodiment, memory sub-system 204 may include software for a software modem 208. Software modem 208 may comprise any type of dial-up software modem that utilizes traditional copper lines to transmit analog signals over a telephone network. Software modem 208 may be arranged to operate in accordance with any number of modem standards, such as the International Telecommunication Union (ITU) V.92 standard, for example. The embodiments are not limited in this context.

In one embodiment, memory sub-system 204 may also include various device drivers, such as High Definition Audio driver (HDAD) 210. HDAD 210 may be used to control and manage an audio controller 216 and High Definition Audio (HDA) bus 224, as described in more detail below. Memory sub-system 204 may include other software and device drivers as well, such as an operating system (OS) for node 200, for example. Examples of OS may include a windows based OS as developed by Microsoft® Corporation, Redmond, Wash. The embodiments are not limited in this context.

In one embodiment, memory sub-system 204 may communicate with other elements of node 200 over a communications bus 212. In one embodiment, for example, communications bus 212 may comprise a Peripheral Component Interconnect (PCI) Express communications bus. The embodiments are not limited in this context.

In one embodiment, node 200 may comprise an audio sub-system 214. Audio sub-system 214 may be coupled to PCI bus 212. Audio sub-system 214 may comprise various audio elements for communicating digital and analog audio information between processor 202 and/or memory sub-system 204 and other elements of node 200.

In one embodiment, for example, audio sub-system 214 may include an audio controller 216. Audio controller 216 may comprise, for example, a HDA controller. Examples of HDA controllers may include an Input/Output Controller Hub (ICH), such as a Sixth Generation (ICH6) and Seventh Generation (ICH7), made by Intel Corporation. The embodiments are not limited in this context.

In one embodiment, audio controller 216 may be implemented using an ICH controller. Some ICH controllers (e.g., ICH6) may also have an integrated Audio CODEC '97 Component Specification, Version 2.3 (AC '97) controller that may be used to attach an audio codec, a modem codec, an audio/modem codec, or a combination of single ACs and single MC. In this implementation, software modem 208 may be implemented as an AC '97 modem for operation with a modem codec (e.g., one of codecs 220-1-$m$). The embodiments are not limited in this context.

In one embodiment, audio sub-system 214 may also include various direct memory access (DMA) elements 218-1-$n$. One or more of DMA elements 218-1-$n$ may be used to transfer audio streams between memory sub-system 204 and various codecs 220-1-$m$ in the audio link. Each DMA element 218-1-$n$ may be arranged to transfer a single audio stream between memory sub-system 204 and one or more codecs 220-1-$m$.

In one embodiment, audio controller 216 and DMA elements 218-1-$n$ may be coupled to codecs 220-1-$m$ using HDA bus 224. Signals may be communicated between audio sub-system 214 and codecs 220-1-$m$ using an audio link. The audio link may be a digitized serial interface that conveys data between audio controller 216 and codecs 220-1-$m$. The desired link protocol may be synchronized by audio controller 216. The embodiments are not limited in this context.

In one embodiment, HDAD 210 has direct access to a register interface for audio controller 216. HDAD 210 performs a number of different bus management operations, such as initializing audio controller 216 and various audio links, enumerating codecs 220-1-$m$ on the audio links, performing run-time management of audio controller 216 and audio links, performing power management of audio controller 216 and audio links, and so forth. The embodiments are not limited in this context.

In one embodiment, codecs 220-1-$m$ may be coupled to one or more I/O devices 222-1-$p$. I/O devices 222-1-$p$ may comprise any number of I/O devices, such as a telephone, speakers, microphones, audio headsets, MP3 devices, I/O adapters, network interfaces, and so forth. In one embodiment, for example, one or more codecs 220-1-$m$ may be coupled to network 106 using the appropriate analog I/O adapter, sometimes referred to as an "analog front end." The embodiments are not limited in this context.

As previously described, it may be desirable to alter the quality of the output analog signals by modifying the sampling rate for codec operations. The communications paths between processor 202 and/or memory sub-system 204 and codecs 220-1-$m$ may have multiple communication buses to communicate digital samples, as well as multiple buffers to temporarily store the digital samples. In some implementations, however, one or more buffers may be outside the control of software modem 208 or the OS for node 200. In fact, software modem 208 may not have any information about such buffers, including the size of the buffer. For example, HDAD 210 may manage one or more buffers used by audio controller 216 and/or HDA bus 224. This lack of knowledge regarding buffers outside of the control of software modem 208 may impair the ability of software modem 208 to vary a sampling rate to adjust the quality of the audio output for some audio applications.

In one embodiment, various conditions may affect one or more characteristics of the digital audio link between the software generating the samples and one or more codecs 220-1-$m$. For example, when software modem 208 is first initialized as node 200 is powered-up the initial sampling rate and any round trip delay issues may need to be addressed. Furthermore, changes or variations in the sample rate may also need to be addressed. The initial setup operations or varying the sampling rate may exceed the communication rate constraints of HDA bus 224, measured in terms of round trip delay, thereby degrading efficiency and throughput of node 200. For example, a soft modem typically allows variations in the sampling rate in order to give the user some flexibility in the quality of the reproduced analog signal (e.g., voice signal). One technique to vary sampling rates is to use a communication rate that is higher than the highest desired sampling rate, and to reduce the sampling rate by tagging certain undesired samples in the sample stream. One or more codecs 220-1-$m$ may be arranged to drop or ignore the tagged samples. As the sample rates change, however, the number of valid samples stored in the buffers in the communications path may also change. Since the OS executing the software modem may be unaware of the buffer sizes controlled by HDAD 210, however, software modem 208 may be incapable of modifying the sample rates in a manner that maintains the desired quality while remaining within the round trip delay constraints of audio controller 216 and HDA bus 224.

The various embodiments may solve these and other problems. In one embodiment, for example, software modem 208 may be arranged to measure a round trip delay of a communications path comprising a communications bus and multiple buffers. The buffers may include a first buffer of a determined size and a second buffer of an undetermined size. Software modem 208 may use the measured round trip delay to adjust a number of samples sent from the first buffer to the second buffer, thereby increasing or decreasing the round trip delay for the communications path to conform with a given set of performance constraints. In this manner, software modem 208 may calibrate the round trip delay in the communications path so that the echo path in the system is consistent between connections. As a result, V.92 Quick Connects may be completed in a reduced amount of time as compared to conventional systems. Node 200 in general, and software modem 208 in particular, may be described in more detail with reference to FIGS. 3-4.

Figure 3:
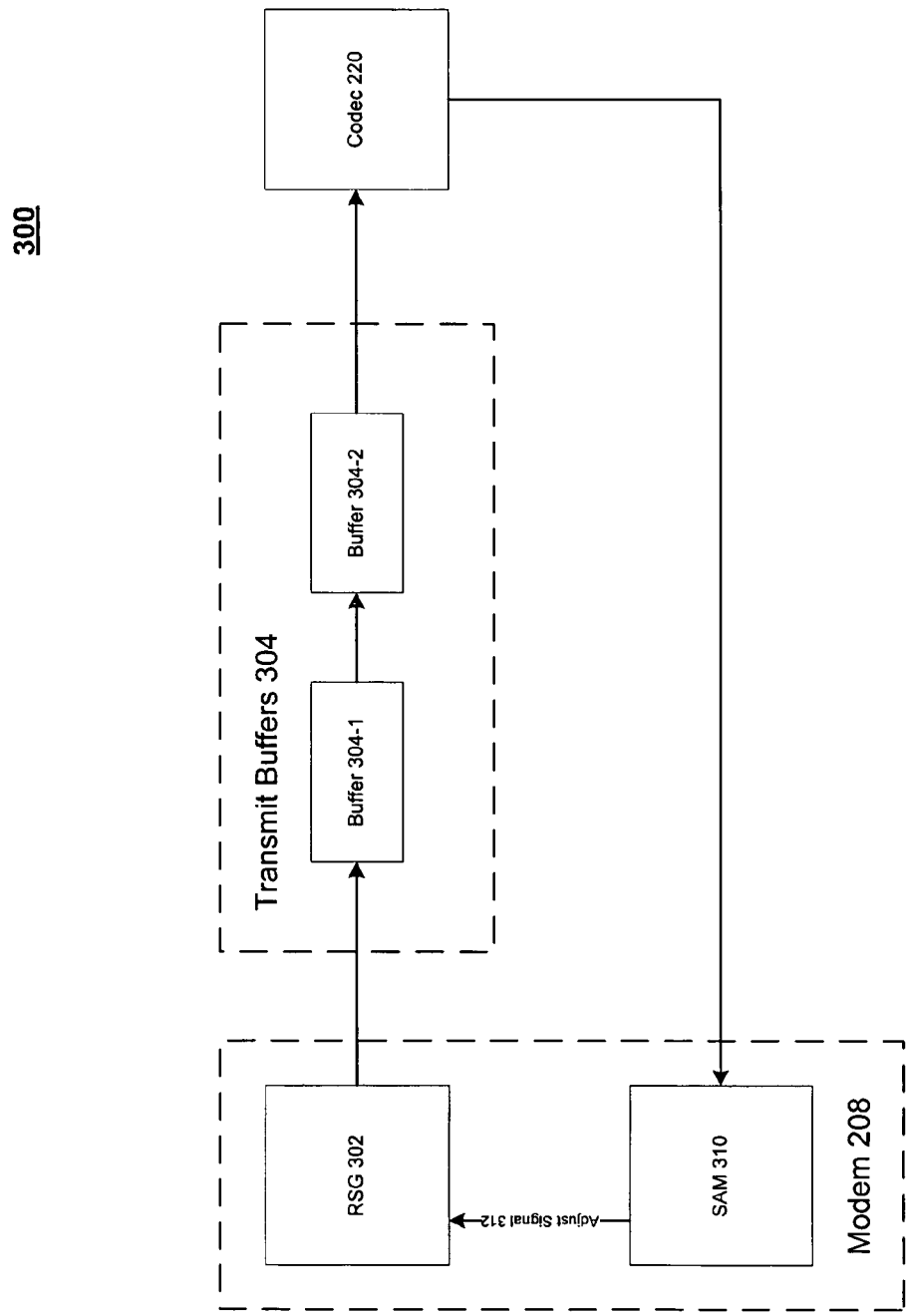
FIG. 3 illustrates one embodiment for a modem sub-system module.

FIG. 3 illustrates one embodiment of a MSM. FIG. 3 illustrates a block diagram of a MSM 300. In one embodiment, MSM 300 may be representative of MSM 104 and/or 110 as described with reference to FIG. 1. As shown in FIG. 3, MSM 300 may comprise multiple elements. These elements may be implemented using one or more circuits, components, registers, processors, software subroutines, modules, or any combination thereof, as desired for a given set of design or performance constraints. Although FIG. 3 shows a limited number of elements by way of example, it can be appreciated that more or less elements may be used in MSM 300 as desired for a given implementation. The embodiments are not limited in this context.

In one embodiment, MSM 300 may include modem 208 as described with reference to FIG. 2. Modem 208 may include a ramp signal generator (RSG) 302. RSG 302 may be arranged to generate a sequence of ramp index values (e.g., samples) for communication to a codec 220-1-*m* over a communications path including a communications bus (e.g., HDA bus 224) and multiple buffers. The ramp index values may be implemented using any values or signals from which a round trip time delay value may be derived. For example, the ramp index values may be sequential values as described in more detail below. The embodiments, however, are not limited in this context.

In one embodiment, MSM 300 may include one or more transmit buffers 304. In one embodiment, for example, transmit buffers 304 may include a first transmit buffer 304-1 and a second transmit buffer 304-2. First transmit buffer 304-1 may be under the control and management of soft modem 208 and/or the OS for node 200, and therefore the size and output of first transmit buffer 304-1 may be determined or known to soft modem 208 and/or the OS. Second transmit buffer 304-2 may be under the control and management of HDAD 210, and therefore the size and output of transmit buffer 304-2 may be undetermined or unknown to soft modem 208 and/or the OS. Although only two buffers are shown in this example, it may be appreciated that any number of buffers may be used and still fall within the scope of the embodiments.

In one embodiment, MSM 300 may also include an echo path from codec 220-1-*m* to RSG 302 that includes a signal analysis module (SAM) 310. In one embodiment, for example, SAM 310 may comprise part of software modem 208. SAM 310 may be arranged to receive an echo of the sequence of ramp index values sent from RSG 302. SAM 310 may compare an echo for one of the sequence of ramp index values with a current ramp index value to find a ramp index difference value. SAM 310 may compare the ramp index difference value with a predetermined threshold value to find a sample adjustment value. SAM 310 may output an adjust signal 312 representative of the sample adjustment value. It is worthy to note that in some implementations the echo path may also include multiple receive buffers. The embodiments are not limited in this context.

In one embodiment, RSG 302 may receive adjust signal 312. RSG 302 may use adjust signal 312 to adjust or modify a number of samples sent from first transmit buffer 304-1 to second transmit buffer 304-2. Adjusting the number of samples sent from first transmit buffer 304-1 to second transmit buffer 304-2 effectively modifies the round trip delay in the communications path between RSG 302 and codec 220-1-*m*. The embodiments are not limited in this context.

Operations for the above embodiments may be further described with reference to the following figures and accompanying examples. Some of the figures may include a logic flow. Although such figures presented herein may include a particular logic flow, it can be appreciated that the logic flow merely provides an example of how the general functionality as described herein can be implemented. Further, the given logic flow does not necessarily have to be executed in the order presented unless otherwise indicated. In addition, the given logic flow may be implemented by a hardware element, a software element executed by a processor, or any combination thereof. The embodiments are not limited in this context.

Figure 4:
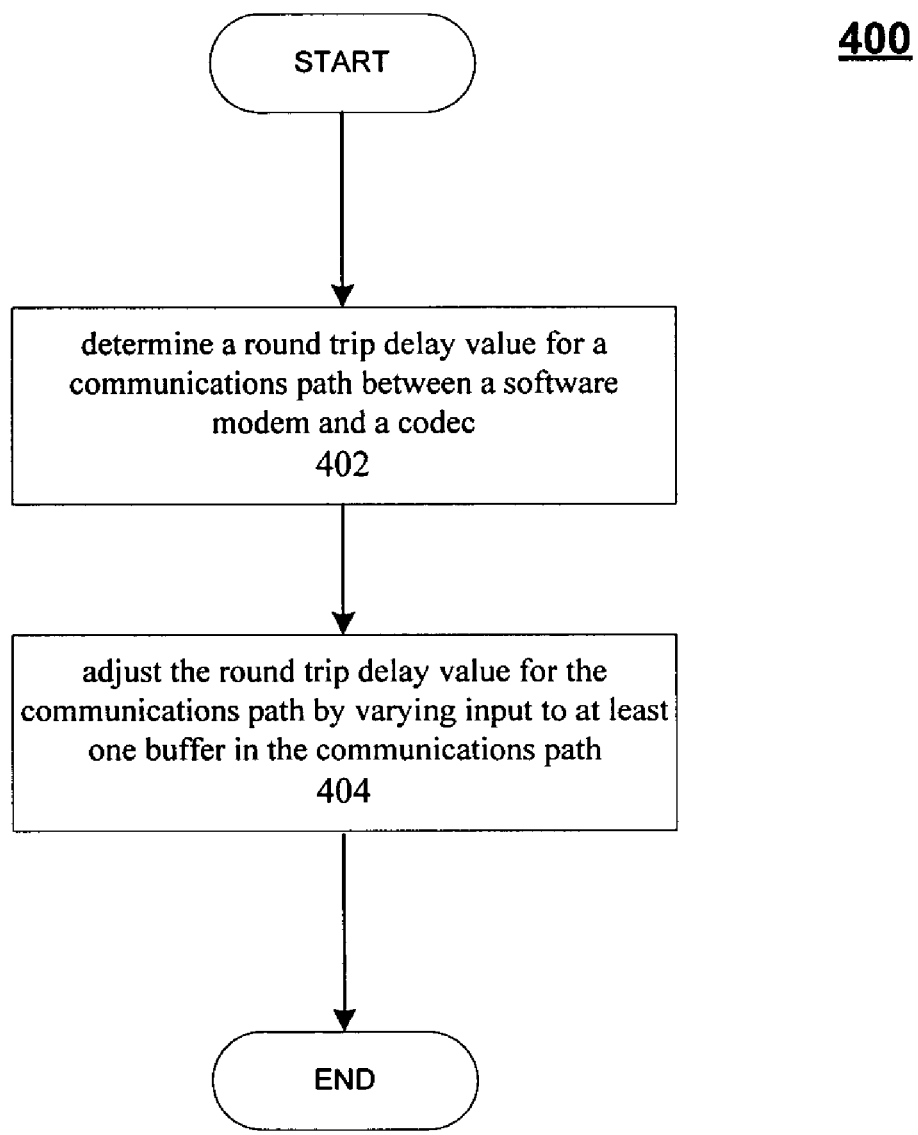
FIG. 4 illustrates one embodiment of a logic diagram.

FIG. 4 illustrates a logic diagram in accordance with one embodiment. FIG. 4 illustrates a logic flow 400. Logic flow 400 may be representative of the operations executed by one or more structure described herein, such as system 100, node 200, and/or MSM 300. As shown in logic flow 400, a round trip delay value for a communications path between a software modem and a codec may be determined at block 402. The round trip delay value for the communications path may be adjusted by varying input to at least one buffer in the communications path at block 404. The embodiments are not limited in this context.

In one embodiment, a sampling rate for a codec may be modified. A round trip delay value for a communications path between a software modem and the codec may be determined. The round trip delay value for the communications path may be adjusted in response to the modified sampling rate. The embodiments are not limited in this context.

In one embodiment, a number of samples sent from a buffer of a determined size to a buffer of an undetermined size within the communications path may be adjusted. The embodiments are not limited in this context.

In one embodiment, a sequence of ramp index values may be transmitted to the codec. An echo of the sequence of ramp index values may be received from the codec. The embodiments are not limited in this context.

In one embodiment, a sequence of ramp index values may be received. One of the sequence of ramp index values may be selected and compared with a current ramp index value to find a ramp index difference value. The ramp index difference value may be compared with a predetermined threshold value to find a sample adjustment value. The number of samples sent from the first buffer of a determined size to the second buffer of an undetermined size within the communications path may be adjusted based on the sample adjustment value.

In one embodiment, for example, the number of samples sent from the first buffer to the second buffer may be decreased in order to decrease the round trip delay value for the communications path. In one embodiment, for example, the number of samples sent from the first buffer to the second buffer may be increased in order to increase the round trip delay value for the communications path. The embodiments are not limited in this context.

The above embodiments may be further described by way of example. Assume software modem 208 or the OS of node 200 is arranged with RSG 302 and SAM 310. RSG 302 may transmit a sequence of ramp index values. SAM 310 may analyze the echoed ramp to adjust the number of samples in a communications path or digital link. RSG 302 may place a series of samples on the digital link which will be echoed back from a device at the termination of the digital link. SAM 310 may receive and analyze the link to measure the difference in the level of the received signal from the transmitted signal. RSG 302 may use this information to control the rate at which the transmitter outputs samples, which effectively establishes a round trip delay in samples between the transmitter and the receiver.

In one example, assume node 102 is a mobile computer having a microphone, a speaker, and a software based V.92 modem 208. Further assume that a user desires to make a telephone call to a user of node 108 over telephone network 106. Software modem 208 may establish a telephone connection with node 108 over telephone network 106. Once the telephone connection is established, a user of node 102 may engage in voice communications with a user of node 108 over the established connection.

During the telephone conversation, the user of node 102 may speak into a microphone 222-2 when desiring to communicate with the user of node 108. The user of node 102 may hear speech from the user of node 108 through a speaker 222-3. The audio information may be communicated over telephone network 106 via a network interface and/or analog front end 222-1.

When communicating audio information from the user of node 102, the user may begin speaking into microphone 222-2. Codec 220-2 may convert the analog speech signals into digital signals at a given sampling rate. The sampling rate may determine the number of samples taken from the analog signal to form the digital representation for the analog signal. In general, a higher sampling rate provides a better quality reproduction than a lower sampling rate. Consequently, the level of the sampling rate may be varied in order to vary the quality of reproduction of the analog voice signal.

Once codec 220-2 converts the analog speech signals into digital signals, the digital samples may be stored in one or more buffers of memory sub-system 204. Under instructions from the OS, audio controller 216 may communicate the digital samples from memory sub-system 204 to modem codec 220-1 via a communications path that may include PCI Express bus 212, HDA bus 224, and one or more buffers of memory sub-system 204 or other memory accessible by audio controller 216. Modem codec 220-1 may convert the digital samples into an analog signal, and send the analog signals to network 106 via I/O device 222-1.

During initialization and/or normal operations, RSG 302 may be arranged to generate a sequence of ramp index values for communication to codec 220-1 over the communications path. The operations of RSG 302 may be represented using the following pseudo-code:

```
Transmitter( )
{
    For x = 1 to NumberOfSamples
    {
        TransmitSample (RampIndex)
        RampIndex = Rampindex + 1
    }
}
```

In this example, assume that node 200 has a performance constraint that the transmitter runs every 10 milliseconds and nominally transmits 96 samples (NumberOfSamples=96) over the communications path. Prior to communicating the digital samples, transmit buffers 304-1 and 304-2 may be initialized to zero. Assuming a 16 bit analog front end, the sequence of ramp index values may start with 0 and increase by 1 through a maximum number of 65535 for a total number of 65536 unique values. RSG 302 may continuously send the sequence of ramp index values from 0 to 65535, wrapping around to 0 once the maximum value has been reached, and beginning the sequence again from 0. This may continue until RSG 302 is terminated.

In one embodiment, RSG 302 may continue to transmit the sequence of ramp index values to modem codec 220-1 over the communications path, which includes transmit buffers 304-1, 304-2 and HDA bus 224, for example. Modem codec 220-1 or some other element in the communications path may be used to reflect and echo the sequence of ramp index values to RSG 302 along an echo path.

In one embodiment, SAM 310 may be arranged to receive an echo of the sequence of ramp index values sent from RSG 302 over the echo path from modem codec 220-1 to memory sub-system 204. The operations of SAM 310 may be represented using the following pseudo-code:

```
Receiver( )
{
    ReceivedData = GetSampleFromReceiveStream( )
    If RampIndex – ReceiveData > DesiredRoundTripDelay
    {
        NumberOfSamples = NumberOfSamples – 1
    }
    If RampIndex – ReceiveData < DesiredRoundTripDelay
    {
        NumberOfSamples = NumberOfSamples + 1
    }
    For x = 2 to 96
    {
        FlushReceiveData = ReceiveSample( )
    }
}
```

As indicated by the above pseudo-code, SAM 310 may compare an echo for one of the sequence of ramp index values with a current ramp index value to find a ramp index difference value. For example, assume RSG 302 begins sending the sequence of ramp index values (or samples) starting with 0. When SAM 310 receives the ramp index value of 0, RSG 302 may be currently transmitting a ramp index value of 200. SAM 310 may compare the ramp index value of 0 received by SAM 310 to the current ramp index value of 200 ready to transmit from RSG 302 to obtain a ramp index difference value, which in this case would be 200.

In one embodiment, SAM 310 may compare the ramp index difference value of 200 with a predetermined threshold value to find a sample adjustment value. The predetermined threshold value may represent an amount of time desired for a given round trip delay. For example, assume the predetermined threshold value was set at 200. The predetermined threshold value of 200 may represent that a sequence of 200 ramp index values or samples are normally transmitted from RSG 302 to modem codec 220-1 and back to RSG 302 for the desired round trip delay set for the communications path. Since the ramp index difference value is 200 and the predetermined threshold value is 200, soft modem 208 may determine that the communications path is communicating samples within a given round trip delay constraint. SAM 310 may output an adjust signal 312 representative of the sample adjustment value, which in this case would be 0.

Assume that a user, the OS or soft modem 208 changes the sampling rate for codec 220-1. In the case of a user selecting the sampling rate, the user may select the sampling rate using a software based user interface available with the OS or software modem 208, for example. MSM 300 may be arranged to vary sampling rates by using a communication rate that is higher than the highest desired sampling rate, and to reduce the sampling rate by tagging certain undesired samples in the sample stream. Modem codec 220-1 may be arranged to drop or ignore the tagged samples. As the sample rates change, however, the number of valid samples stored in transmit buffers 304-1, 304-2 may also change, which may alter the effective round trip delay in the communications path.

To compensate for the affect on the round trip delay in the communications path, SAM 310 may compare an echo for one of the sequence of ramp index values with a current ramp index value to find a ramp index difference value. Continuing with our previous example, assume SAM 310 receives a ramp index value of 500. SAM 310 may determine that RSG 302 is currently transmitting a ramp index value of 701. SAM 310 may compare the ramp index value of 500 received by SAM 310 to the current ramp index value of 701 ready to transmit from RSG 302 to obtain a ramp index different value of 201. SAM 310 may compare the ramp index difference value of 201 with the predetermined threshold value of 200 to find a sample adjustment value of 1. Since the ramp index difference value of 201 is greater than the predetermined threshold value of 200, soft modem 208 may assume that the change in sampling rate has increased the round trip delay for the communications path. SAM 310 may output an adjust signal 312 representative of the sample adjustment value, which in this case would be 1.

In one embodiment, RSG 302 may receive adjust signal 312. RSG 302 may use adjust signal 312 to adjust or modify a number of samples sent from first transmit buffer 304-1 to second transmit buffer 304-2. Adjusting the number of samples sent from first transmit buffer 304-1 to second transmit buffer 304-2 effectively modifies the round trip delay in the communications path between RSG 302 and codec 220-1-m. It is worthy to note that since RSG 302 does not have access or control over second transmit buffer 304-2, RSG 302 may not be capable of directly modifying the number of samples sent from the second transmit buffer 304-2.

In this example, RSG 302 may receive adjust signal 312 representing a sample adjustment value of 1. RSG 302 may typically send 9600 samples every 10 ms. RSG 302 may decrease the number of samples sent to 9599, thereby decreasing the amount of samples stored by known transmit buffer 304-1. Decreasing the amount of samples stored by known transmit buffer 304-1 results in a decrease in the number of samples sent from transmit buffer 304-1 to unknown transmit buffer 304-2. Decreasing the number of samples sent from transmit buffer 304-1 to transmit buffer 304-2 may effectively reduce the round trip delay value for the communications path. RSG 302 may continue to make adjustments to the number of samples transmitted to transmit buffer 304-1 until the round trip delay is back within the desired performance constraints.

In the opposite case, assume that SAM 310 determines that the ramp index difference value is lower than the predetermined threshold. In this case, soft modem 208 may assume that the change in sampling rate has decreased the round trip delay for the communications path. SAM 310 may output an adjust signal 312 representative of a sample adjustment value of −1, for example. RSG 302 may receive adjust signal 312, and potentially increase the number of samples transmitted by RSG 302. For example, if RSG 302 is currently sending 9599 samples every 10 ms, RSG 302 may increase the number of samples sent to the original number of 9600 samples, thereby increasing the amount of samples stored by known transmit buffer 304-1. The embodiments are not limited in this context.

Numerous specific details have been set forth herein to provide a thorough understanding of the embodiments. It will be understood by those skilled in the art, however, that the embodiments may be practiced without these specific details. In other instances, well-known operations, components and circuits have not been described in detail so as not to obscure the embodiments. It can be appreciated that the specific structural and functional details disclosed herein may be representative and do not necessarily limit the scope of the embodiments.

It is also worthy to note that any reference to "one embodiment" or "an embodiment" means that a particular feature, structure, or characteristic described in connection with the embodiment is included in at least one embodiment. The appearances of the phrase "in one embodiment" in various places in the specification are not necessarily all referring to the same embodiment.

Some embodiments may be implemented using an architecture that may vary in accordance with any number of factors, such as desired computational rate, power levels, heat tolerances, processing cycle budget, input data rates, output data rates, memory resources, data bus speeds and other performance constraints. For example, an embodiment may be implemented using software executed by a general-purpose or special-purpose processor. In another example, an embodiment may be implemented as dedicated hardware, such as a circuit, an application specific integrated circuit (ASIC), Programmable Logic Device (PLD) or digital signal processor (DSP), and so forth. In yet another example, an embodiment may be implemented by any combination of programmed general-purpose computer components and custom hardware components. The embodiments are not limited in this context.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

Some embodiments may be implemented, for example, using a machine-readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, and the like. The instructions may be implemented using any suitable high-level, low-level, object-oriented, visual, compiled and/or interpreted programming language, such as C, C++, Java, BASIC, Perl, Matlab, Pascal, Visual BASIC, assembly language, machine code, and so forth. The embodiments are not limited in this context.

Unless specifically stated otherwise, it may be appreciated that terms such as "processing," "computing," "calculating," "determining," or the like, refer to the action and/or processes of a computer or computing system, or similar electronic computing device, that manipulates and/or transforms data represented as physical quantities (e.g., electronic) within the computing system's registers and/or memories into other data similarly represented as physical quantities within the computing system's memories, registers or other such information storage, transmission or display devices. The embodiments are not limited in this context.

While certain features of the embodiments have been illustrated as described herein, many modifications, substitutions, changes and equivalents will now occur to those skilled in the art. It is therefore to be understood that the appended claims are intended to cover all such modifications and changes as fall within the true spirit of the embodiments.

The invention claimed is:

1. An apparatus, comprising:
a communications path comprising a communications bus and buffers;
a codec to couple to said communications bus;
a processor to couple to said communications bus, said processor to execute instructions for a software modem, said processor to modify a sampling rate for said codec, determine a round trip delay value for said communications path, and adjust said round trip delay value in response to said modified sampling rate by varying input to one of said buffers; and
a signal analysis module to receive an echo of a sequence of ramp index values, and adjust a number of samples sent from a first buffer to a second buffer based on said echo of said sequence of ramp index values;
wherein at least one of said buffers is outside the control of said software modem.

2. The apparatus of claim 1, comprising a memory to store said buffers, said buffers to comprise a first buffer of a determined size and a second buffer of an undetermined size.

3. The apparatus of claim 1, comprising a ramp signal generator to generate a sequence of ramp index values for communication to said codec over said communications path.

4. The apparatus of claim 1, said signal analysis module to compare an echo for one of said sequence of ramp index values with a current ramp index value to find a ramp index difference value, compare said ramp index difference value with a predetermined threshold value to find a sample adjustment value, and adjust said number of samples based on said sample adjustment value.

5. A system, comprising:
a communications medium;
a modem sub-system module, said modem sub-system module to comprise:
a communications path comprising a communications bus and buffers;
a codec to couple to said communications bus;
a processor to couple to said communications bus, said processor to execute instructions for a software modem, said processor to modify a sampling rate for said codec, determine a round trip delay value for said communications path, and adjust said round trip delay value in response to said modified sampling rate by varying input to one of said buffers; and
a signal analysis module to receive an echo of a sequence of ramp index values, and adjust a number of samples sent from a first buffer to a second buffer based on said echo of said sequence of ramp index values;
wherein at least one of said buffers is outside the control of said software modem.

6. The system of claim 5, comprising a memory to store said buffers, said buffers to comprise a first buffer of a determined size and a second buffer of an undetermined size.

7. The system of claim 5, comprising a ramp signal generator to generate a sequence of ramp index values for communication to said codec over said communications path.

8. A method, comprising:
modifying a sampling rate for a codec
determining a round trip delay value for a communications path between a software modem and said codec;
adjusting said round trip delay value for said communications path in response to said modified sampling rate by varying input to at least one buffer in said communications path;
receiving an echo of a sequence of ramp index values, and adjusting a number of samples sent from a first buffer to a second buffer based on said echo of said sequence of ramp index values;
wherein at least one of said first and second buffers is outside the control of said software modem.

9. The method of claim 8, comprising adjusting a number of samples sent from a buffer of a determined size to a buffer of an undetermined size within said communications path.

10. The method of claim 8, comprising:
transmitting a sequence of ramp index values to said codec; and
receiving an echo of said sequence of ramp index values from said codec.

11. The method of claim 8, comprising:
receiving a sequence of ramp index values;
comparing one of said sequence of ramp index values with a current ramp index value to find a ramp index difference value;
comparing said ramp index difference value with a predetermined threshold value to find a sample adjustment value; and adjusting a number of samples sent from a first buffer of a determined size to a second buffer of an undetermined size within said communications path based on said sample adjustment value.

12. The method of claim 11, comprising decreasing said number of samples sent from said first buffer to said second buffer to decrease said round trip delay value.

13. The method of claim 11, comprising increasing said number of samples sent from said first buffer to said second buffer to increase said round trip delay value.

14. An article comprising a computer-readable storage medium containing instructions that if executed enable a system to modify a sampling rate for a codec, determine a round trip delay value for a communications path between a software modem and said codec, adjust said round trip delay value for said communications path in response to said modified sampling rate by varying input to at least one buffer in said communications path, receive an echo of a sequence of ramp index values, and adjust a number of samples sent from a first buffer to a second buffer based on said echo of said sequence of ramp index values; wherein at least one of said first and second buffers is outside the control of said software modem.

15. The article of claim 14, further comprising instructions that if executed enable the system to adjust a number of samples sent from a buffer of a determined size to a buffer of an undetermined size within said communications path.

16. The article of claim 14, further comprising instructions that if executed enable the system to transmit a sequence of ramp index values to said codec, and receive an echo of said sequence of ramp index values from said codec.

17. The article of claim 14, further comprising instructions that if executed enable the system to receive a sequence of ramp index values, compare one of said sequence of ramp index values with a current ramp index value to find a ramp index difference value, compare said ramp index difference value with a predetermined threshold value to find a sample adjustment value, adjust a number of samples sent from a first buffer of a determined size to a second buffer of an undetermined size within said communications path based on said sample adjustment value.

* * * * *